United States Patent [19]

Rey et al.

[11] Patent Number: 5,318,707
[45] Date of Patent: Jun. 7, 1994

[54] METHOD OF CLARIFYING PHOSPHORIC ACID

[75] Inventors: Paul A. Rey, Coraopolis; Wood E. Hunter, Pittsburgh, both of Pa.

[73] Assignee: Calgon Corporation, Pittsburgh, Pa.

[21] Appl. No.: 936,462

[22] Filed: Aug. 28, 1992

[51] Int. Cl.$^5$ .............................................. B01D 21/01
[52] U.S. Cl. .................................. 210/734; 423/320; 423/321.1
[58] Field of Search ............... 210/725, 727, 728, 733, 210/734; 423/320, 321 R, 321 S

[56] References Cited

U.S. PATENT DOCUMENTS

| | | | |
|---|---|---|---|
| 3,644,091 | 2/1972 | Naschke et al. | 210/732 |
| 4,291,005 | 9/1981 | Poulos et al. | 210/734 |
| 4,342,653 | 8/1982 | Halverson | 210/907 |
| 4,569,768 | 2/1986 | McKinley | 210/734 |
| 4,800,071 | 1/1989 | Kaesler et al. | 210/734 |
| 5,173,280 | 12/1992 | Rey et al. | 423/321 R |

OTHER PUBLICATIONS

CA99:214925y Lipta Kova et al; CS 204,404 (1983).
CA86:123780n Niyazba Kova et al; Deposited Doc. (1973) VINITI7551-73.
CA91:195236r Dombalov; Khim Ind (Sofia) (1979).
CA83:1819f Harper et al; GB1401682 (1975).
CA96:8835d; Japan Kokai JP8188,814 (1981).

*Primary Examiner*—Peter A. Hruskoci
*Attorney, Agent, or Firm*—W. C. Mitchell; C. G. Cochenour

[57] ABSTRACT

A method for clarifying phosphoric acid by flocculation or coagulation of solids wherein an effective amount of a carboxylic-type polymer having a portion of sulfonic functionality is used as the clarification aid. Preferred polymers are high molecular weight acrylic acid/acrylamido methylpropyl sulfonic acid-type polymers.

2 Claims, No Drawings

METHOD OF CLARIFYING PHOSPHORIC ACID

BACKGROUND OF THE INVENTION

The primary method of manufacturing phosphoric acid is by digestion of phosphate rock with acid. This is commonly referred to as the "wet" process for phosphoric acid production. Apatite (calcium phosphate) is the most commercially valuable phosphate mineral. Sulfuric acid is the most commonly used acid for digestion. A by-product of wet process phosphoric acid production is the generation of a significant amount of calcium and magnesium sulfates (commonly referred to as phosgyp), and to a lesser degree other impure precipitates. The insoluble solids are typically removed by filtration, usually on a horizontal pan filter. The solids are then discharged as a waste product and the filtered acid is concentrated by evaporators with a clarification process between each stage. The final acid concentration is determined by the end use and can be as high as 67 to 76% $P_2O_5$, which is known as superphosphoric acid. Fertilizer production accounts for about 90% of phosphate rock utilization.

After the phosphate matrix has been mined, it is beneficiated by washing, screening and/or flotation processes to concentrate the phosphatic material. The concentrate phosphate rock consists of phosphates of calcium, magnesium and the like with some organic as well as inorganic impurities. This material is dissolved by hot (140°-190° C.) sulfuric acid to yield a phosphoric acid solution of about 28% $P_2O_5$. The sulfuric acid reacts with the cations in the phosphatic ore matrix, producing insoluble precipitates. The bulk of the insoluble solids consist of sulfates of calcium and magnesium which are removed by filtration prior to concentration of the acid. Additional solids are generated during concentration of the acid and are removed through sedimentation in clarifiers.

Flocculants are often used to aid the clarification process. See, for example, U.S. Pat. No. 3,644,091, which discloses the use of water soluble sulfonated polystyrenes having molecular weights of from about 1 to about 40 million as phosphoric acid clarification aids.

U.S. Pat. No. 4,800,071 discloses the use of sulfonated acrylamide and sulfonated acrylamide/acrylate polymers to aid in the filtration of gypsum in the "wet" process for production of phosphoric acid.

Copending application U.S. Ser. No. 776,101 discloses the use of sulfonic acid/acrylamide-type polymers in the clarification of phosphoric acid streams and U.S. Ser. No. 775,888 discloses the use of acrylic acid/sulfonic acid polymers in gypsum slurry filtration.

U.S. Pat. No. 4,291,005 discloses the use of acrylamide/ammonium acrylate polymers for settling suspended solids in phosphoric acid production solutions. Polymers claimed consist essentially of a predominant proportion of acrylic acid units and a minor portion of acrylamide units.

Japanese Patent No. JP 56/88814 (CA96(2):8835d) discloses the use of acrylamide/(methacryloyloxy) ethyldimethylbenzelammonium chloride copolymers to flocculate solids from phosphoric acid.

Czechoslovakian Patent No. CS204404 B (CA99(26):214925y) discloses the use of melamine formaldehyde and $PhNH^2$ formaldehyde condensates for clarification of suspended solids in phosphoric acid. CA86(18):123780 and CA99(12):903x relate to the effect of polyacrylamide on the filtration rate of phosphogypsum.

CA91(24):195236r discloses the effect of various polyacrylamides and polyethylene oxide polymers on the filterability of phosphogypsum.

By contrast, the present invention relates to the use of carboxylic-type polymers possessing a portion of sulfonic functional groups as flocculation aids to improve the separation of suspended solids from all grades of phosphoric acid. This invention is not disclosed or suggested by any of the above references, alone or in combination.

SUMMARY OF THE INVENTION

The instant invention is directed to the clarification of phosphoric acid using designated carboxylic-acid polymers with a portion of sulfonic functionality. More particularly, this invention is directed to an improved method of clarifying phosphoric acid by flocculation of solids which is characterized by the addition of an effective amount of a high molecular weight polymer consisting of carboxylic acid and sulfonic moieties, followed by removal of said solids from the stream being treated. The instant invention further relates to the clarification of phosphoric acid produced when phosphate rock is treated with sulfuric acid, filtered and concentrated. The resulting acid is then clarified by addition of an effective amount of one of the polymers designated herein, followed by separation or removal of solids from the stream being treated.

The flocculant agent is selected from a class of copolymers which previously has not been used for this application. The preferred polymer is a copolymer of acrylate and a sulfonated monomer. The polymer composition should contain at least about 1 mole percent sulfonate and have a reduced viscosity of at least 0.5 dl/g as measured at 0.05% active polymer in 1.0M NaCl. In general, sulfonated monomer is more expensive than acrylic acid and it is best to keep the content of the sulfonated portion as low as possible for cost effectiveness. The preferred sulfonated monomer is 2-acrylamido-2-methylpropanesulfonic acid (AMPSA), which is commercially available from Lubrizol Corporation.

The term carboxylic acid refers to acrylic members of the polymers which includes acrylate or methacrylate salts in the form of sodium, ammonium, potassium and the like and is not meant to limit the invention. In any case, in a strong acid environment, such as is found in the instant streams, the salts when added to the acid solution convert to the acrylic acid or methacrylic acid form.

DETAILED DESCRIPTION OF THE INVENTION

The instant invention is directed to a method for clarifying a solids-laden phosphoric acid stream, by removal of solids therefrom, which method comprises adding an effective amount of a high molecular weight carboxylic acid/sulfonic acid-type polymer, or a salt thereof, to said phosphoric acid stream, followed by removal or separation of solids from the stream being treated. Compositions comprising a phosphoric acid stream and the instant polymers are also claimed.

More particularly, the carboxylic acid/sulfonic acid-type polymers of the instant invention comprise a) an unsaturated carboxylic acid selected from the group consisting of acrylic acid, methacrylic acid, their salts and mixtures thereof; b) at least about 0.5%, by weight of the polymer, of an unsaturated sulfonic acid selected from the group consisting of 2-acrylamido-2-methylpropyl sulfonic acid, 2-methacrylamido-2-methylpropylsulfonic acid, vinyl sulfonic acid, sulfoalkyl acrylate, sulfoalkyl methacrylate, allyl sulfonic acid, methallyl sulfonic acid, 3-methacrylamido-2-hydroxy propyl sulfonic acid, sulfonic acid acrylate, their salts and mixtures thereof; and, optionally, c) up to about 50%, by weight of the polymer, of acrylamide or methacrylamide.

Preferably, the carboxylic acid sulfonic acid-type polymers of the instant invention comprise: a) about 5 to about 95%, by weight, of acrylic acid, methacrylic acid or salts thereof; b) about 95% to about 5%, by weight, of a sulfonic acid selected from the group consisting of 2-acrylamido-2-methylpropyl sulfonic acid, 2-methacrylamido-2-methylpropyl sulfonic acid and salts thereof; and, optionally c) up to about 50%, by weight, acrylamide.

The most preferred polymers are believed to be polymers which comprise: a) about 80 to about 20%, by weight, acrylic acid and b) about 20 to about 80%, by weight, 2-acrylamido-2-methylpropyl sulfonic acid.

The instant polymers may be prepared by conventional polymerization techniques. Such polymers are available from Calgon Corporation, Pittsburgh, Pa.

The instant polymers should have molecular weights of at least about 500,000, as determined by viscometry. Preferably, the instant flocculant polymers should have molecular weights of at least about 2,000,000, and polymers having molecular weights in excess of 5,000,000 are especially preferred.

An effective amount of the instant polymers should be used. As used herein, the "effective amount" refers to that dosage of polymer, on an active basis, necessary to give the desired level of clarification in the system being treated.

Preferably the instant clarification aids should be added so as to provide a dosage in the range of from about 0.1 to about 500 ppm, based on active polymer weight and the total weight of the phosphoric acid stream being clarified.

The instant polymers are preferably added to a clarifier feed stream, though any conventional method of adding flocculant to a clarifier can be utilized, including the use of multiple feed points. In processes which utilize multiple clarifiers, it is preferred to add an effective amount of polymer to each clarifier feed stream. The term "clarifier", as used herein, refers to any clarification device, including, for example, conventional rake clarifiers, Lamella gravity settlers and solid bowl centrifuges.

Phosphoric acid streams of any $P_2O_5$ concentration can be treated. Such streams generally contain from about 0.01 percent to about 20 percent, by weight, solids. Preferably, phosphoric acid streams containing from about 25 to about 75 weight percent $P_2O_5$ are treated.

It is noteworthy that the mineralogy of precipitated solids in a phosphoric acid stream generally varies with acid concentration. Below about 45% $P_2O_5$, the solids precipitated are generally gypsum and fluorosilicates with small amounts of iron and aluminum. Above about 45% $P_2O_5$, iron and aluminum compounds such as iron and aluminum phosphate become more prevalent in the solids. The instant polymers are generally efficacious with respect to the solids present at any acid concentration. However, the optimal balance of carboxyl/sulfonic functional groups or the polymers can vary with the mineralogy of the solids.

The inventors have found the instant polymers to be especially effective in the removal of insoluble organics from phosphoric acid streams. Such organics are naturally occurring constituents of the phosphate ore matrix.

EXAMPLES

The following examples further demonstrate the instant invention. They are not, however, intended to limit the scope of the invention in any way. In these examples, various flocculants were evaluated using a conventional jar test procedure.

EXAMPLES 1-14

Acid clarification jar tests were conducted on 30% and 40% $P_2O_5$ phosphoric acid samples obtained from the clarifier feed lines of a Florida phosphoric acid plant. Percent solids in these samples were 2.1%, by weight, for the 30% acid and 2.7%, by weight, for the 40% acid. Results after the designated time are shown in Tables I and II below. In these tables, AA is acrylic acid, AM is acrylamide and AMPSA is 2-acrylamido-2-methylpropyl sulfonic acid.

TABLE I

30% Phosphoric Acid
(2.1% Total Suspended Solids)

| Example Number | Product | MW | Dosage* (mg/L) | % Solids remaining after 5 min. settling Time |
|---|---|---|---|---|
| 1+ | Untreated | — | 0.0 | 0.6 |
| 2+ | 63/37 AM/AMPSA | 10 MM | 5.3 | 0.4 |
| 3+ | 69/31 AM/AA | 15 MM | 3.8 | 0.3 |
|  | 69/31 AM/AA | 15 MM | 5.0 | 0.4 |
| 4+ | 30/70 AM/AMPSA | 8 MM | 4.0 | 0.2 |
|  | 30/70 AM/AMPSA | 8 MM | 5.4 | 0.4 |
| 5 | 30/70 AA/AMPSA | 6 MM | 4.4 | 0.4 |
|  | 30/70 AA/AMPSA | 6 MM | 5.8 | 0.3 |
| 6 | 72/28 AA/AMPSA | 6 MM | 3.9 | 0.2 |
|  | 72/28 AA/AMPSA | 6 MM | 5.1 | 0.2 |

+Comparison examples
*"Active Polymer" basis

TABLE II

40% Phosphoric Acid
(2.7% Total Suspended Solids)

| Example Number | Product | MW | Dosage* (mg/L) | % Solids remaining after 5 min. settling Time |
|---|---|---|---|---|
| 7+ | Untreated | — | 0.0 | 1.4 |
| 8+ | 27/73 AM/AA | 10 MM | 6.6 | 1.0 |
| 9+ | 69/31 AM/AA | 15 MM | 5.0 | 1.2 |
| 10+ | 30/70 AM/AMPSA | 8 MM | 5.3 | 1.2 |
| 11 | 30/70 AA/AMPSA | 6 MM | 5.8 | 0.8 |
| 12 | 72/28 AA/AMPSA | 6 MM | 5.1 | 0.6 |

+Comparison examples
*"Active Polymer" basis

With both the 30% and 40% acid streams, the AA/AMPSA copolymer was clearly with best performer, removing fines as well as coarse solids.

What is claimed is:

1. A method for clarifying a solids-laden phosphoric acid stream which comprises adding an effective amount of a high molecular weight carboxylic acid/sulfonic acid polymer to said phosphoric acid stream to flocculate said solids, and then settling the flocculated solids to clarify said stream, wherein said polymer comprises: a) about 80 to about 20%, by weight, of an unsaturated carboxylic acid selected from the group consisting of acrylic acid, methacrylic acid, their salts and mixtures thereof; and b) about 20 to about 80%, by weight, of an unsaturated sulfonic acid selected from the group consisting of 2-acrylamido-2-methyl propyl sulfonic acid, 2-methacrylamido-2-methylpropyl sulfonic acid, their salts and mixtures thereof; and wherein said polymer has a molecular weight of at least about 500,000.

2. The method of claim 1, wherein said effective amount is from about 0.1 to about 500 ppm on an active polymer basis, based on the weight of said phosphoric acid stream.

* * * * *